(12) United States Patent
Namba et al.

(10) Patent No.: US 6,494,783 B2
(45) Date of Patent: Dec. 17, 2002

(54) COMPUTER-READABLE RECORDING MEDIUM WHEREON A GAME PROCEDURE CONTROL PROGRAM IS RECORDED, SERVER, AND GAME PROCEDURE CONTROL METHOD

(75) Inventors: Kazuhiro Namba, Amagasaki (JP); Norio Nakayama, Osaka (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 0 days.

(21) Appl. No.: 09/918,044

(22) Filed: Jul. 30, 2001

(65) Prior Publication Data

US 2002/0016194 A1 Feb. 7, 2002

(30) Foreign Application Priority Data

Jul. 31, 2000 (JP) ........................................ 2000-232348

(51) Int. Cl.[7] .............................. A63F 13/00; A63F 9/24
(52) U.S. Cl. .............................................. 463/3; 463/37
(58) Field of Search ............................ 463/3, 4, 7, 37, 463/38

(56) References Cited

U.S. PATENT DOCUMENTS

| | | | | |
|---|---|---|---|---|
| 4,672,541 A | * | 6/1987 | Bromley et al. | 364/410 |
| 6,244,956 B1 | * | 6/2001 | Nayakama et al. | 463/3 |
| 6,257,983 B1 | * | 7/2001 | Rimoto | 463/38 |
| 6,270,413 B1 | * | 8/2001 | Aikawa et al. | 463/31 |
| 6,368,210 B1 | * | 4/2002 | Toyohara et al. | 463/3 |
| 2001/0005689 A1 | * | 6/2001 | Fujioki et al. | 463/4 |
| 2001/0031655 A1 | * | 10/2001 | Tanibuchi et al. | 463/3 |
| 2001/0044333 A1 | * | 11/2001 | Okishio et al. | 463/3 |
| 2002/0016195 A1 | * | 2/2002 | Namba et al. | 463/3 |

FOREIGN PATENT DOCUMENTS

TW 367833 8/1999

\* cited by examiner

*Primary Examiner*—Denise L. Esquivel
*Assistant Examiner*—Marc Norman
(74) *Attorney, Agent, or Firm*—Jordan and Hamburg LLP

(57) ABSTRACT

A baseball game is made realizable in an environment difficult to achieve with a dedicated game apparatus and a joy stick for such an apparatus. When a player team is at bat, the positioning point of the bat of a batter character relative to a ball character and the batting action of the batter character are determined by manipulating a mouse 22, while, when the player team is in the field, the pitching action and the pitch course for the ball character displayed moving from a pitcher character toward the batter character are determined by manipulating the mouse 22, and upon the end of the game, the particulars of the game results and the particulars of the batting results and pitching results of the player team are uploaded to a recording unit 42 in a server system 16 connected via a network 12 to computers 14.

11 Claims, 17 Drawing Sheets

FIG.16

RANKING 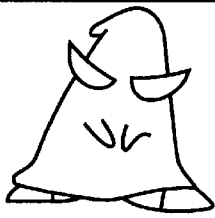

RANKING RESULTS!

☻ MARK: CURRENT HOME RANKING (# OF HOME RUNS)
.... MOUSE PAD
☻ MARK: HOME RUN BATTING AVG RANKING 2ND
(# OF HOMERUNS) ....MOUSE PAD
☻ MARK: HOME RUN BATTING AVG RANKING 3RD
(# OF HOME RUNS).... MOUSE PAD
✎ MARK: CURRENT FLUTTERING BAT AWARD (5).... KEY CHAIN
⊗ MARK: CURRENT FLUTTERING BALL AWARD (7).... STICKER
ARROW ON RIGHT END: ⇧ INDICATES GOING UP IN THE RANKING,
⇩ INDICATES GOING DOWN IN THE RANKING

CURRENTLY HIGHEST WINNING PTS 56    CURRENTLY RANKED WINNING PTS 5

|    |     | nick name | score | money | # of HR | Power | Meet |    |
|----|-----|-----------|-------|-------|---------|-------|------|----|
| 1  | ☻   | aaa       | 56    | 29    | 29      | 20    | 20   | ⇧  |
| 2  |     | bbb       | 50    | 99999 | 1000    | 20    | 20   | ⇧  |
| 2  | ☻   | ccc       | 50    | 2     | 2       | 20    | 20   | ⇧  |
| 4  | ☻   | ddd       | 38    | 33    | 33      | 20    | 20   | ⇧  |
| 5  |     | eee       | 37    | 28    | 28      | 20    | 20   | ⇧  |
| 6  |     | fff       | 36    | 46    | 38      | 19    | 21   | ⇧  |
| 6  |     | ggg       | 36    | 29    | 29      | 20    | 20   | ⇧  |
| 8  |     | hhh       | 34    | 34    | 34      | 20    | 20   | ⇧  |
| 9  |     | iii       | 33    | 31    | 31      | 20    | 20   | ⇧  |
| 10 | ⊗   | jjj       | 30    | 30    | 30      | 20    | 20   | ⇧  |
| 10 |     | kkk       | 30    | 32    | 29      | 99    | 99   | ⇩  |
| 10 |     | mmm       | 30    | 1     | 1       | 99    | 99   | ⇩  |
| 13 |     | nnn       | 28    | 25    | 15      | 20    | 20   | ⇧  |
| 14 |     | ppp       | 27    | 27    | 27      | 20    | 20   | ⇩  |
| 15 | ✎   | qqq       | 26    | 26    | 26      | 20    | 20   | ⇩  |
| 16 |     | rrr       | 25    | 25    | 25      | 20    | 20   | ⇩  |
| 16 |     | sss       | 25    | 50    | 10      | 20    | 20   | ⇩  |
| 18 |     | ttt       | 24    | 24    | 24      | 20    | 20   | ⇧  |
| 18 |     | uuu       | 24    | 24    | 24      | 20    | 20   | ⇩  |

COMPUTER-READABLE RECORDING MEDIUM WHEREON A GAME PROCEDURE CONTROL PROGRAM IS RECORDED, SERVER, AND GAME PROCEDURE CONTROL METHOD

BACKGROUND OF THE INVENTION

1. Field of the Invention

This invention relates to a computer-readable recording medium whereon a game procedure control program is recorded, to a server provided with that recording medium, and to a game procedure control method.

2. Description of the Related Art

In recent years, competitive games such as tennis, soccer, and baseball have come to be widely played on the monitors of programmed computer apparatuses. The content of such games is very diverse, but commonly, in almost all cases, a player (a game player) uses a control input device to control the behavior of a player character, and a score is awarded on the basis of how aptly the player character behaved toward a ball put in play by a competitor character controlled by the computer apparatus or a human game opponent. In the case of a baseball game, for example, scoring is based on how well a batter character that is the player character hits back a ball thrown by a pitcher character that is the competitor character.

The particulars of the control inputs made at such time by the player mainly include determinations of the position and attitude of the batter character, bat type selection, bat adjustment, and bat swing timing, swing position, and swing angle, etc. In order to effect such control inputs as these, a control input device connected to the main unit of the computer apparatus is usually used. This control input device is generally made so that it detects amounts of displacement in the X-coordinate direction and Y-coordinate direction input by the player, specifies some two-dimensional coordinate position, and communicates that specified coordinate position to the main unit of the computer apparatus. The position and so forth of the batter character are effected by specifying this coordinate position. Also, a timing signal is generated when a switch is depressed at some time, with provision made so that that timing signal is communicated to the main unit of the computer apparatus. The bat swing timing is determined by that timing signal.

Largely categorized, there are two types of computer apparatuses, namely those specially made for games, such as dedicated game apparatuses, and those which can handle a wide range of applications, such as personal computers. In the case of the former, an analog joy stick, digital joy stick, or controller on which such are mounted is used for the control input device. An analog joy stick has sensors deployed at the base end of a projecting member of a prescribed size for outputting X coordinates and Y coordinates as analog values, so that, when a player manipulates the projecting member by tilting same with his or her fingers, any coordinate position in a two-dimensional area can be designated in accordance with the amount of that tilt. A digital joy stick usually has cross-shaped keys that have sensors (or switches) for eliciting coordinates in various directions, namely up, down, left, and right, made so that, when a player continually depresses one or two keys, any coordinate position in a two-dimensional area can be designated.

The control input device for a personal computer, on the other hand, is generally a pointing device such as a mouse, portable trackball, or portable slide pad, etc. Of these, both the mouse and the portable trackball each have a pair of sensors for detecting amounts of displacement in the X coordinate and Y coordinate, respectively, and a ball member that simultaneously drives both sensors. These devices are made so that, by rolling the ball member in a target direction, either directly by the player's hand or indirectly via the surface of the desk, a coordinate position in a two-dimensional area can be designated. The slide pad has sensors for sensing the position where it is touched by a human finger, the direction of movement thereof and the amount of movement thereof, made so that any coordinate position in a two-dimensional area can be designated based on the sensing results. In principle, the slide pad implements the mechanism of a mouse or the like with digital techniques.

The main difference between control input devices used with a dedicated game apparatus and those used with a personal computer lies in the way the pointer is manipulated. Specifically, in the case of various joy sticks, the pointer is usually not displayed on the screen. This can be said to be advantageous in the sense that the visual recognition characteristics on the screen are not lost. Data corresponding to the pointer (hereinafter called the virtual pointer) do exist inside the apparatus, but because that virtual pointer will be dislocated so long as the player continues to press the projecting member or cross-shaped key, the joy stick is superior to a mouse or the like in terms of operability when simply causing a displacement in a desired direction by a certain amount, or quickly returning to the home position.

Nevertheless, the data input by the joy sticks relates only to the displacement direction, and the relative size of the displacement in the virtual pointer can only depend on the relative length of the input time. With a mouse or the like, on the other hand, the pointer is always displayed. Moreover, the data input by the mouse or the like relates both to displacement direction and displacement amount, whereupon it becomes possible to input pointer displacement direction and displacement amount with a single manipulation, irrespective of the relative length of the input time. That being so, the mouses and the like are superior to the various joy sticks for applications in games where the pointer is displaced to a random position at high speed and a next action is required at that displaced position.

At the present time, dedicated game apparatuses are more commonly used than personal computers as computer apparatuses for games, and the content of game programs presupposes control by the control input device of a dedicated game apparatus. Nevertheless, the pointer is not displayed in a dedicated game apparatus, as noted above, whereupon it is very difficult to implement a game wherein the pointer is accurately displaced to a random position at high speed and a next action at that displaced position becomes necessary. With a dedicated game apparatus, moreover, the person running the game is limited to the person who purchased it, and there are impediments to implementing games wherein many people can freely participate. Compared thereto, a general purpose computer apparatus such as a personal computer has a broad user base, and has a broader usable range than a dedicated game apparatus as relating to communications infrastructure such as networks.

SUMMARY OF THE INVENTION

Thereupon, an object of the present invention is to provide a computer-readable recording medium whereon a game procedure control program is recorded, a server, and a game procedure control method that are capable of implementing a game in an environment difficult to achieve with a dedicated game apparatus and a joy stick used with such an apparatus.

In order to achieve the object noted above, according to the present invention, a computer-readable recording medium whereon a game procedure control program is recorded for causing a pointer and a game image containing a plurality of game character to be displayed on a monitor screen of a computer and for, at the same time, receiving the input of instruction particulars relating to the display position of a pointer resulting from movement control inputs on the monitor screen for that pointer from a pointing device such as a mouse, and clicking operations with that pointing device, made by a player, and executing a baseball game, wherein: the baseball game is one that is advanced by a player team and a team based on computer control, using a ball character as a game medium, alternately coming to bat and taking to the field; and the game procedure control program determines the positioning point for the ball character at the bat of a batter character and the batting action of the batting character by manipulating the pointing device when the player team is at bat, determines a pitching course and pitching action, by control inputs from the pointing device, for the ball character caused to be displayed moving so as to proceed from a pitcher character toward the batter character when the player team is in the field, accepts the end of the game, and causes the game result particulars and the particulars of both the batting results and the pitching results of the player team to be uploaded to a recording unit in a server connected to the computer via a network.

Based on the above invention, a pitcher character throwing a ball character and a batter character hitting the ball character that is hurled in are displayed on the monitor screen, and, when the player team is up to bat, the positioning point for the ball character at the bat of the batter character and the batting action thereof are determined by manipulating the pointing device. When the player team is in the field, the pitching course and pitching action for the ball character displayed moving so as to proceed toward the batter character from the pitcher character are determined by manipulating the pointing device. When the game is finished, the particulars of the game results together with the particulars of the batting results and pitching results for the player team are uploaded to a recording unit in a server connected via a network to the computer operated by the player. Thus it becomes possible to implement a baseball game in an environment difficult to achieve with a dedicated game apparatus and a joy stick for such an apparatus.

These and other objects and advantages of the present invention will become more apparent upon reading of the following detailed description along with the accompanied drawings.

BRIEF DESCRIPTION OF THE DRAWINGS

FIG. 16 is a diagram representing a ranking table displayed on the monitor in the game system diagrammed in FIG. 1.

DESCRIPTION OF THE PREFERRED EMBODIMENTS

Figure 1:
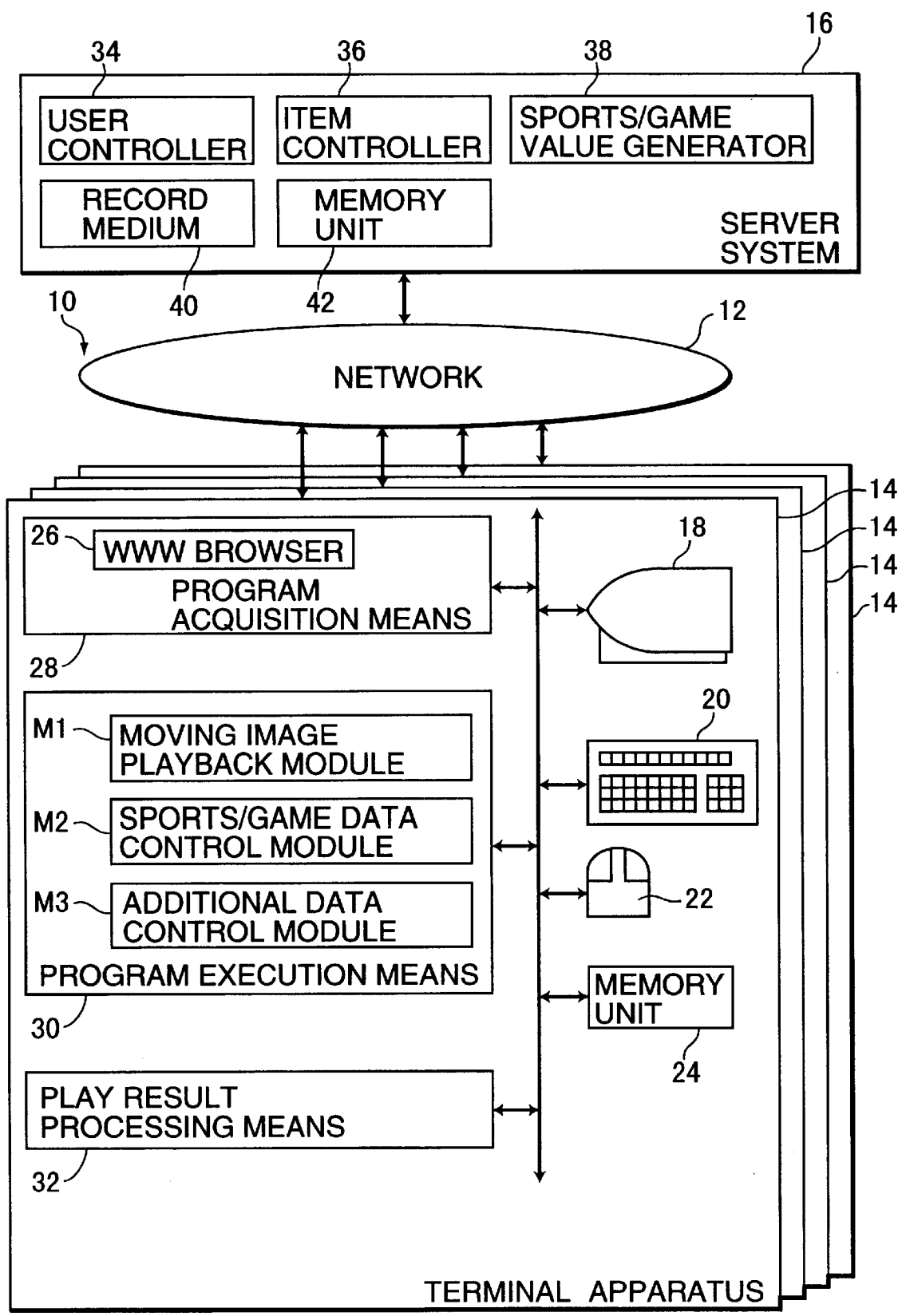
FIG. 1 is a diagram of the configuration of a game system relating to one embodiment aspect of the present invention.

FIG. 1 is a diagram for describing the configuration of a game system 10 wherein the game procedure control method relating to one embodiment aspect of the present invention is employed. In this diagram, the game system 10 is configured so as to comprise a plurality of personal computers 14 that are terminal apparatuses connected by the internet 12, and a server system 16. In this embodiment aspect, moreover, a description is given for the case of an application to a baseball game that is a competitive game wherein a player (game player) with a personal computer 14 (hereinafter called the computer 14) can participate via the internet 12 at any time.

In the computer 14, a display 18, keyboard 20, mouse 22, and memory unit 24 consisting of RAM or the like are connected. This computer 14 has network ware for making it possible to connect to the internet 12, and also has a WWW browser 26 incorporated therein. In this embodiment aspect, program acquisition means 28, program execution means 30, and play result processing means 32 are built into the computer 14 in order to implement the baseball game.

The program acquisition means 28, after making an initial registration to the server system 16, acquires the prescribed sports/game program (baseball game program) from a page screen provided by the server system 16 and opens it in its own memory area. A functional module for program acquisition may be produced independently, but, more simply, the sports/game program can be acquired from a page screen of the server system 16 using the functions of the WWW browser 26 as they come. Furthermore, provision may be made so that this sports/game program is acquired by the computer 14 from the server system 16 every time the game is played, or provision may be made so that it is acquired only at the time of initial registration and kept resident thereafter in the computer 14.

What is here called the sports/game program is configured of a moving image playback module M1, a sports/game data control module M2, and an additional data control module M3. In a preferred aspect all of the modules are present in the server system 16 in an integrated fashion, but an aspect is permissible also wherein the individual modules are present in dispersed fashion in other server systems. In the former case, one URL (uniform resource locator) is written in the page screen presented by the server system 16, and provision is made so that the user, by designating that URL, can automatically acquire all of the modules. In the latter case, the URLs of each of the individual modules are written in the page screen of the server system 16, and provision is made so that all of the modules can be acquired indirectly.

The moving image playback module M1 plays back three-dimensional moving images. For this module, use can be made, for example, of the "Shockwave" made by Micromedia and used widely on the internet.

The sports/game data control module M2 controls the base data for the moving images played back by the moving image playback module M1 and various kinds of data for developing the story of the game. In this embodiment aspect, this sports/game data control module M2 controls image data, audio data, and text data and the like relating to items necessary in implementing the baseball game, such as the pitcher character, batter character, ball character and shadow thereof that is one example of a flying object, meet cursor that is the acquisition point, strike zone, ball target point, home plate, and stands and other background, etc., according to the rules of the game.

Of the various types of data, at least the image data are controlled so that one display image is formed in multiple layers. That is, provision is made so that the movement and other expression forms of the game character can be changed layer by layer. In a control form based on such multiple layers, there is the advantage of being able to reduce the number of base data during moving image playback.

The additional data control module M3 controls additional data relating to the game. These additional data are such as power points and meet points provided from the server system 16. A power point is a parameter for extending the flight distance of the ball character. The higher this power point becomes, the greater the flight distance of the ball character becomes, and the easier it is to score a home run. A meet point is a parameter that indicates how well the ball character is struck. The higher this meet point becomes, the larger the meet cursor becomes, and the easier it is to strike the ball character.

The power point is provided by the player finding a power item on the page screen of the server system 16 and notifying the server system 16 thereof. The meet point is provided from the server system 16 when statistical values for number of at bats, batting average, and number of home runs and the like reach or exceed certain values.

The program execution means 30, by running programs in other modules centered on the program in the sports/game data control module M2, generate various events relating to the baseball game, and elicit the results thereof by arithmetic computation. More specifically, the sports/game data control module M2 or the like is downloaded into the WWW browser 26, the program is made to run using a CGI (common gateway interface), and various events are generated. All displays of images and text used by the game are made on the browser screen, and all communications of information between the server system 16 and the player are performed via the WWW browser 26 and the CGI of the server system 16.

The play result processing means 32, working in conjunction with the sports/game data control module M2, etc., performs processing relating to the baseball game results, that is, more specifically, performs bi-directional communications to the server system 16 and presents information to the player, etc.

Furthermore, the program execution means 30 and the play result processing means 32 can be implemented by the WWW browser 26 and the group of modules acquired by the computer 14 from the server system 16 as described above, but a form is also possible wherewith program code for implementing the functions noted above, in part or in whole, is recorded on a recording medium like a CD-ROM or the like, or a carrier medium that can be specified by a "signal" form, and downloaded suitably to the computer 14 prior to performing the baseball game, for example.

The server system 16, meanwhile, besides the basic server functions for presenting the page screen to the computers 14, also has the functions of a user controller 34, an item controller 36, and a sports/game value generator 38. These functions are formed by program code recorded in a form that is readable by the CPU in the server system 16. The server system 16 also has la recording medium 40 comprising a CD-ROM or hard disk or the like for recording sports/game programs and the like provided via the internet in response to requests from the player, and a memory unit 42 comprising RAM or the like for storing data transmitted from the computers 14.

The user controller 34 controls the user-specific information that is accessed through the page screen and brought in, accumulated values and statistical values for baseball game results, and incentive information and the like, player by player, and sends meet points, according to the results, to the players. The user controller 34 also has functions for performing security checks on accesses, as necessary.

The item controller 36 controls a plurality of items that are parameters for enhancing the capabilities of the pitcher and batter characters manipulated by the players of the computers 14. These items are buried in one or other of the plurality of page screens provided beforehand in a condition that is invisible to the players. They grant power points when the players find power items.

The sports/game value generator 38 generates incentive information for each player relative to the baseball game results (number of home runs, batting average, earned run average, number of batters struck out, etc.). What is here called incentive information is information that gives the players the opportunity to continue the game, of which various kinds are conceivable. Examples would include prize information, or value information pertaining thereto, which the game sponsor grants to a player when certain conditions are satisfied, such as a keyword or the like that enables free access to a site ordinarily accessible for a fee. This incentive information can be established in stages. In that case, provision is made so that, at the earliest stage, ranking distinctions are made in order to inform one player as to how the game capabilities of that player are positioned relative to the game capabilities of other players, and certain displays are made to players who are given incentives at the various stages.

Next, a description is given of procedures for actually conducting a baseball game with a system like that described in the foregoing, based on the flowcharts given in FIGS. 2 to 6, and making reference to the display images given in FIGS. 7 to 17. In this baseball game, in this embodiment aspect, the player team plays three innings against a team controlled by the computer (hereinafter called the computer team) (that is, the same player repeatedly alternates between being at bat and being in the field), and, at the point in time when the game is finished, based on the cumulated values of the winning points of the player team relative to the computer team, that player team is ranked with other player teams playing the same baseball game via the internet 12. By winning points are meant the difference between the score of the player team and the score of the computer team. If the player team has scored 5 runs and the computer team has scored 3 runs, for example, the winning points would be "+2," whereas if the player team has scored 3 runs and the computer team has scored 5 runs, then the winning points would be "−2."

Furthermore, when the player team is at bat, the hitting action of the batter is controlled by the player using a mouse or other pointing device, with the movements of runners and the like handled automatically according to the rules of baseball. When the player team is in the field, the throwing motion of the pitcher is controlled by the player using the mouse or other pointing device, with the actions of the fielders and other baseball players being handled automatically according to the rules of baseball.

A pointing device such as a mouse is used in view of such facts as that, it being possible with a single manipulation to input the displacement direction and displacement amount of a pointer displayed on the monitor 18, the pointer can easily be displaced to a random position at high speed, even by one not skilled, as that pointing devices are most commonly used by computer players, and as that, because, unlike with a joystick, the pointer is displayed in real time at the position control-input by the player, it is therefore easy to guide a pitching point or batting point to that pointer.

Figure 2:
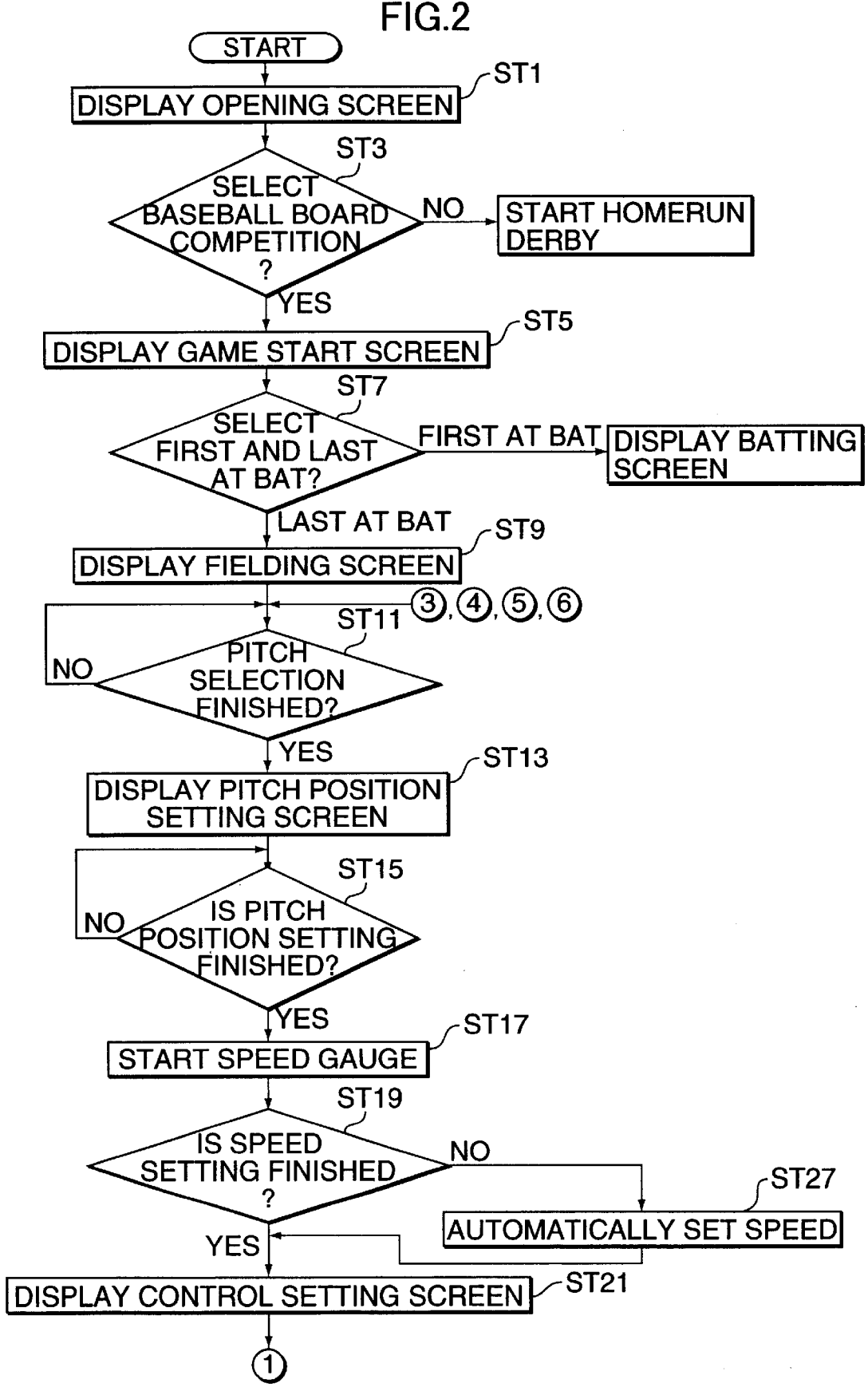
FIG. 2 is a flowchart for describing the operations of the game system diagrammed in FIG. 1.
Figure 3:
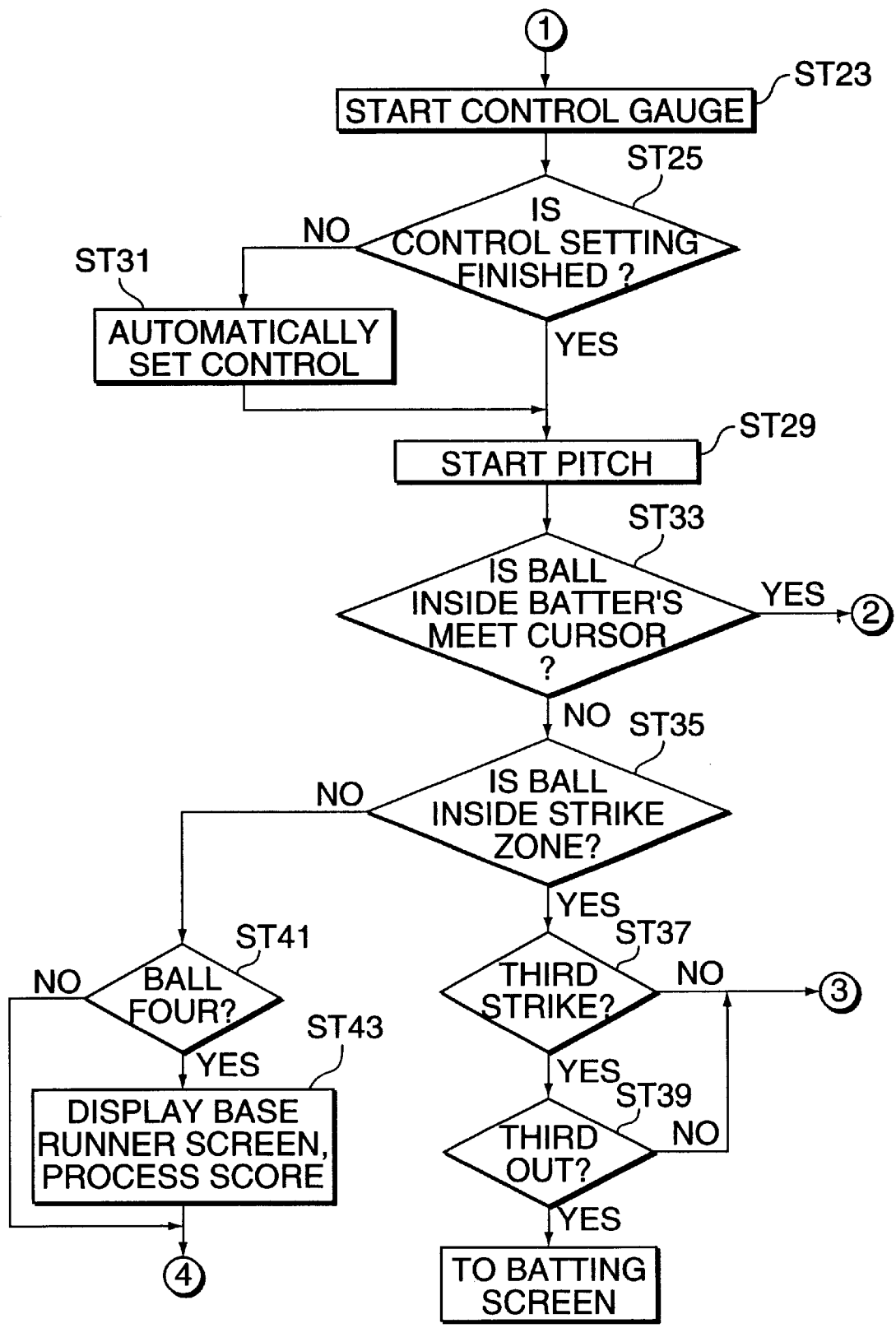
FIG. 3 is a flowchart for describing the operations of the game system diagrammed in FIG. 1.
Figure 4:
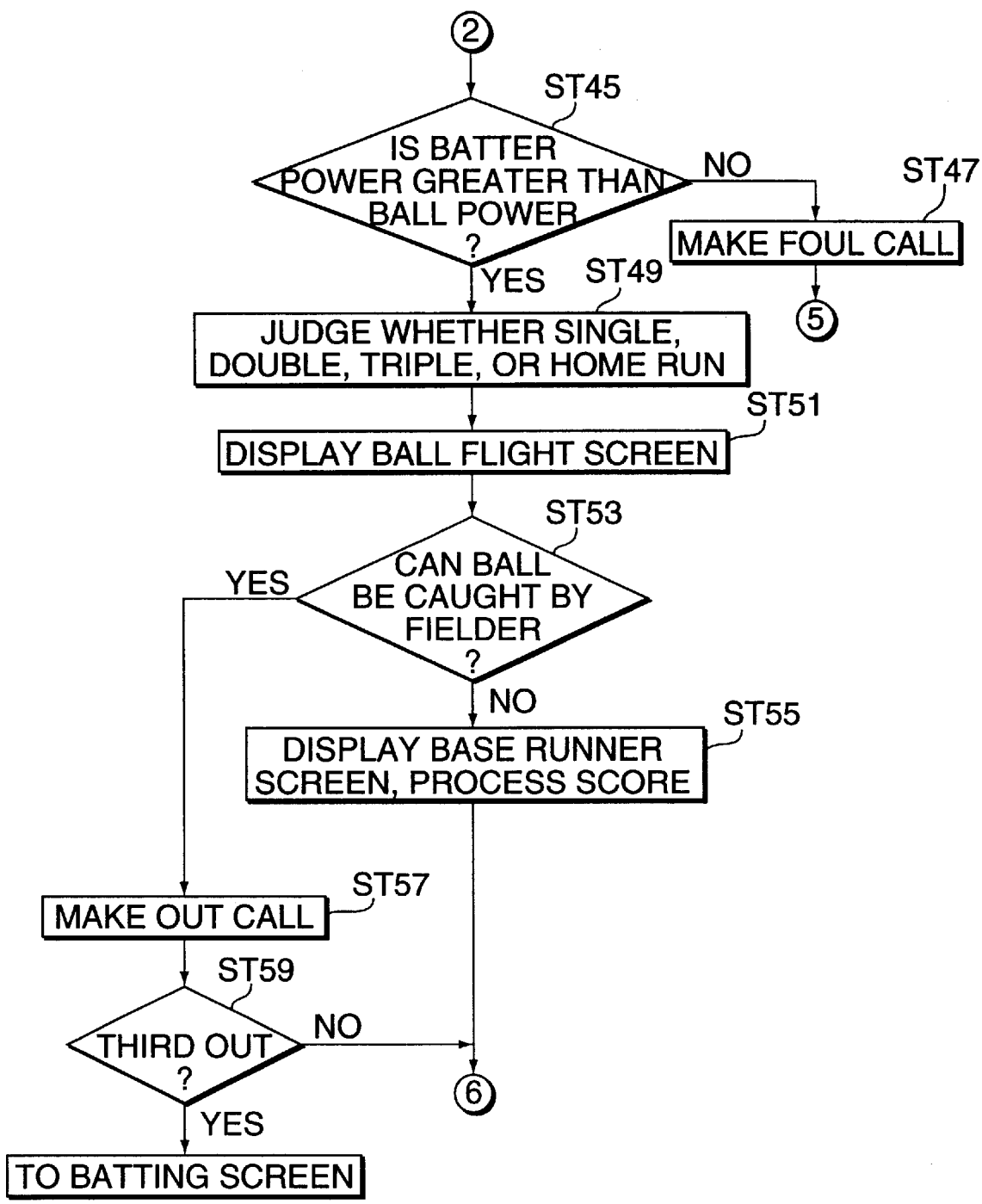
FIG. 4 is a flowchart for describing the operations of the game system diagrammed in FIG. 1.
Figure 7:
FIG. 7 is a diagram representing a game screen displayed on a monitor in the game system diagrammed in FIG. 1.

In the flowcharts given in FIGS. 2 to 4, an opening screen like that diagrammed in FIG. 7 is first displayed on the monitor 18 (step ST1). In this opening screen diagrammed in FIG. 7, in addition to the menu screens "baseball board competition" and "homerun derby" being displayed, input screens are displayed for entering the player name (Name) and email address (E-mail address). This "baseball board game" refers to the baseball game implemented in this embodiment aspect, while "homerun derby" refers to a game wherein players try to hit balls thrown by a pitcher (each player getting ten pitches, for example), with the winner being the one hitting the most homeruns.

Figure 8:
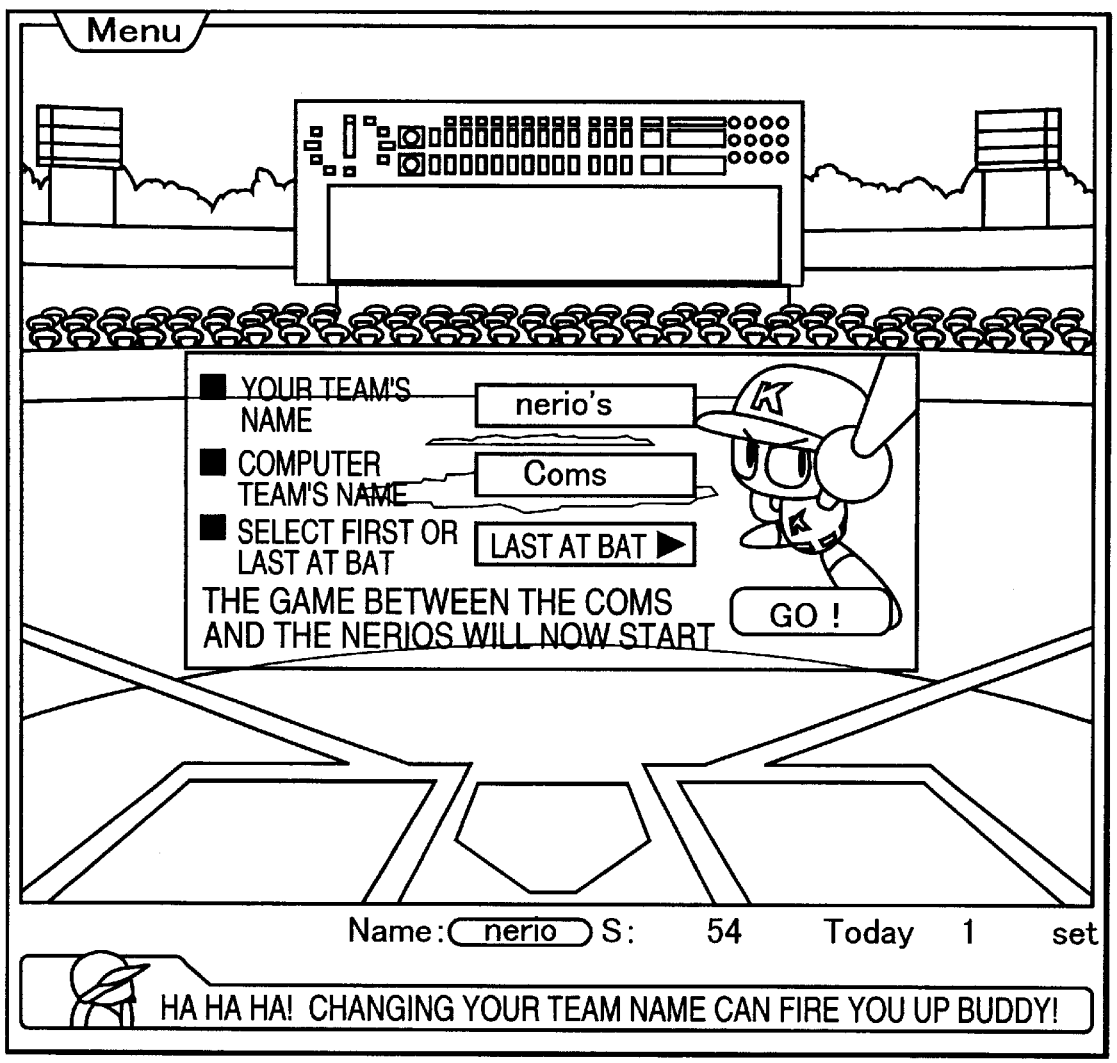
FIG. 8 is a diagram representing a game screen displayed on a monitor in the game system diagrammed in FIG. 1.

Here, when "baseball board competition" is selected and the name (nickname) and email address of the player team initially registered are entered from the keyboard 20, a determination is then made as to whether or not baseball board competition was selected (step ST3). When the name and email address of the player team entered are verified and a determination made that "baseball board competition" was selected, the game start screen diagrammed in FIG. 8 is displayed (step ST5). When the determination is negative in step ST3, on the other hand, "homerun derby" will have been selected, but no further description of the "homerun derby" is given in this specification.

In this game start screen, the name "nerios" of the player team and the name "Coms" of the computer team are displayed, and a screen for selecting whether to be first at bat or last at bat is displayed. Here, "last at bat" is selected for the player team and the "GO" button is clicked on. Thereupon, a determination is made as to whether first at bat or last at bat was selected (step ST7), and, with it being determined that last at bat was selected, the fielding (defense) screen diagrammed in FIG. 9 is displayed three-dimensionally, roughly from the point of view of the catcher character (step ST9).

In this fielding screen, the pitcher character PC of the player team is displayed roughly in the center of the screen, and the batter character BT of the computer team is displayed in the batter's box. Between the pitcher character PC and home plate HB is displayed a pitch selection window WD, and an information panel JK is displayed at the lower right of the screen for indicating such game information as the number of the inning, whether the top or bottom of the inning, and the score, etc. In the pitch selection window WD shown here are displayed five pitch types, namely fastball, curve, screwball, etc., but, of these, only the fastball is displayed initially, at initial registration. Provision is made so that, as certain conditions are satisfied, such as the number of games pitched by the pitcher character and number of strike outs induced, etc., (the number of different pitches) is progressively increased.

Figure 9:
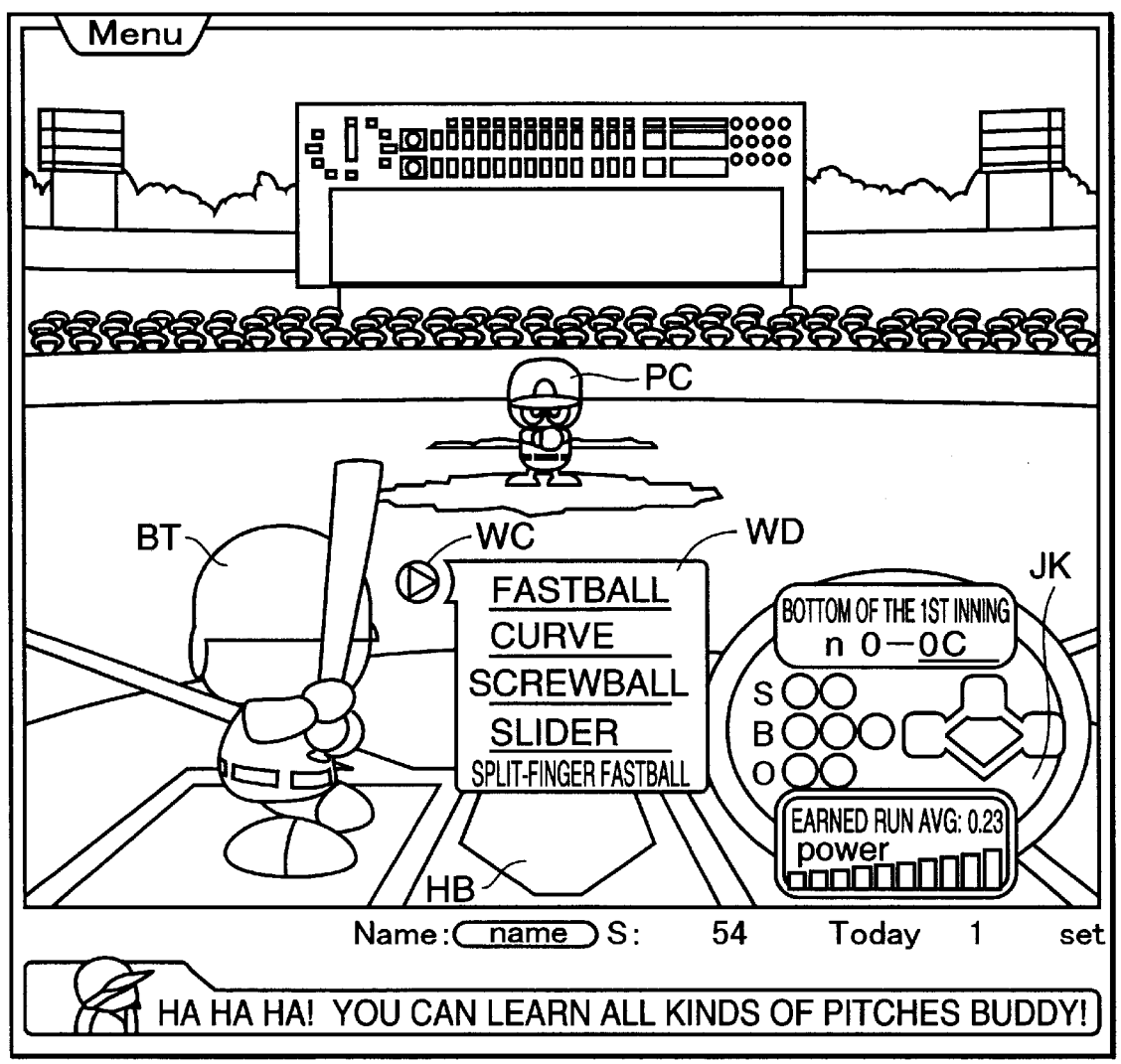
FIG. 9 is a diagram representing a game screen displayed on the monitor in the game system diagrammed in FIG. 1.

In the fielding screen diagrammed in FIG. 9, when the pitch type is selected by manipulating the mouse 22 so as to drag the cursor WC into position over the requisite pitch type in the pitch selection window WD and right-clicked (selecting the screwball in this instance), a determination is then made as to whether or not some pitch or other was selected (step ST11). If this determination is negative, the system waits until a pitch selection is made and, when the determination becomes affirmative, the pitch position setting screen diagrammed in FIG. 10 is displayed (step ST13).

In the pitch position setting screen, with only the pitch selected (here the screwball) left displayed in the pitch selection window WD, a strike zone SZ comprising a square frame divided vertically and horizontally into 16 squares for setting the pitch position (ball target point) is displayed above the home plate HB. Below this strike zone SZ is displayed a speed gauge SG for setting the speed of the pitch. This pitch position is the position of the ball when it passes over the home plate HB. The speed gauge SG is established so that the left end position indicates the maximum ball speed, with that speed declining as the position is moved toward the right end. Provision is made so that, when the pitch position is determined, an indicator SI that was at the right end position moves at high speed to the left end.

Figure 10:
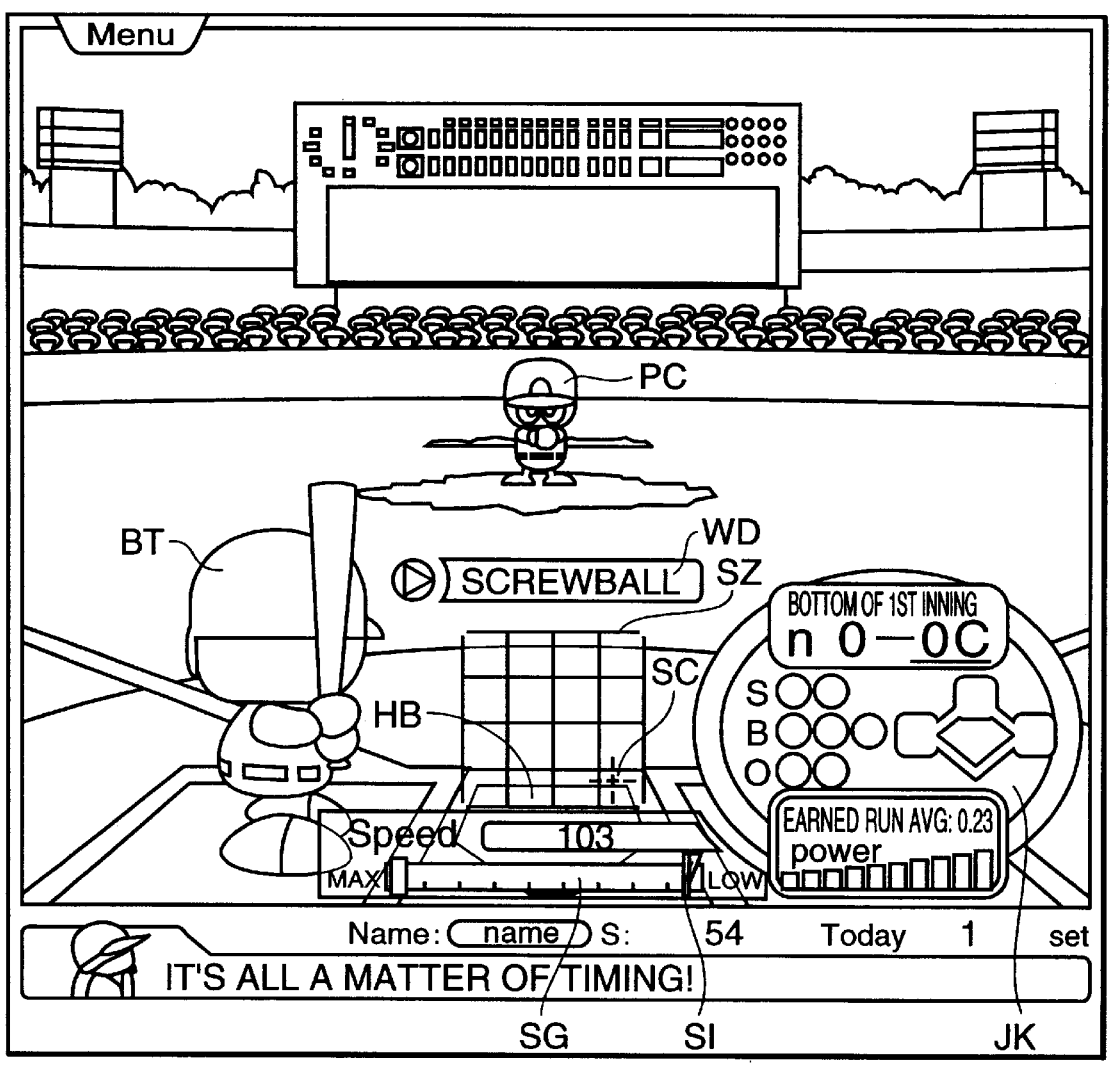
FIG. 10 is a diagram representing a game screen displayed on the monitor in the game system diagrammed in FIG. 1.

In the pitch position setting screen diagrammed here in FIG. 10, when the pitch position is set by positioning the pointer displayed in linkage with the mouse 22 over the cursor SC, moving the cursor SC to the requisite square among the 16 divided squares in the strike zone SZ, and right-clicking, a determination is then made as to whether or not a pitch position has been set (step ST15). It this determination is affirmative, the speed gauge SG indicator SI moves at high speed from the low-speed position at the right end toward the high-speed position side on the left end (step ST17). If the determination in step ST15 is negative, the system waits until the pitch position is set. The pitch position sets the course of the pitched ball, and thus it is also possible to set it outside the strike zone SZ.

Figure 11:
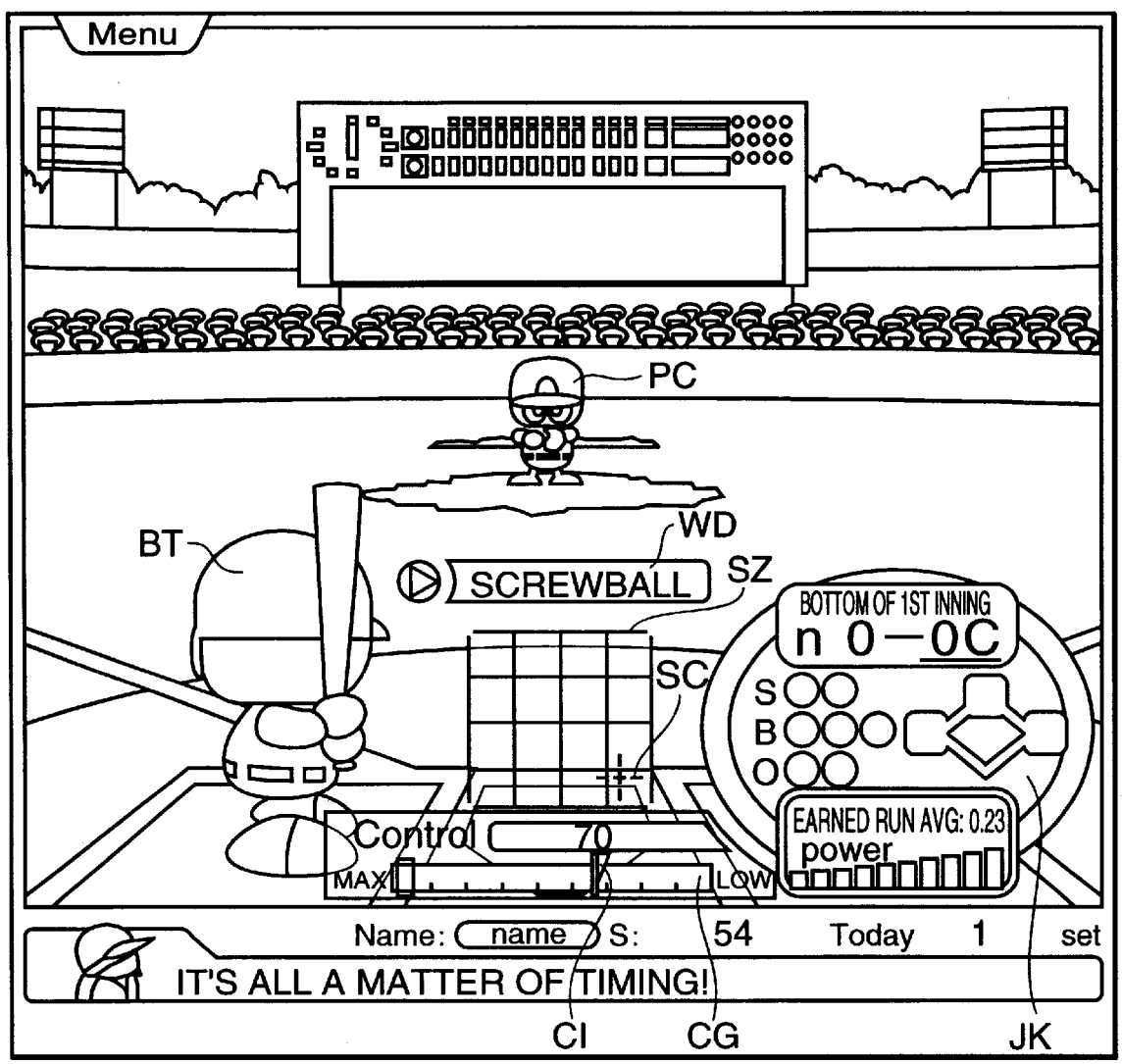
FIG. 11 is a diagram representing a game screen displayed on the monitor in the game system diagrammed in FIG. 1.

When the speed gauge SG indicator SI begins to move in this way, if the player stops the movement of the indicator SI by left-clicking the mouse at just the right time and thereby sets a prescribed speed, a determination is then made as to whether or not a speed was set (step ST19). The speed can be set in a range of 80 to 160 km/h. When the speed setting is finished, a speed value (103 km/h in this example) is displayed above the speed gauge. If the determination in step ST19 is affirmative, the control setting screen diagrammed in FIG. 11 is displayed (step ST21).

In this control setting screen, a control gauge CG is displayed in the position where the speed gauge SG was displayed in place of the speed gauge SG, so that a pitch can be made skillfully at the pitch position set. That is, when this control setting screen is displayed, at roughly the same time as that display is made, the indicator CI of the control gauge CG moves at high speed from the right end position of small control value toward the left end position of large control value (step ST23).

At this time, if the player stops the movement of the indicator CI by left-clicking the mouse with good timing and thereby sets a certain control value, a determination is then made as to whether or not control was set (step ST25). When the control setting is finished, a control value (70 in this case) is displayed above the control gauge. When the determination in step ST19 is negative, the system will wait only a certain time for the speed to be set and, when that certain time has elapsed, a preset speed will be automatically set (step ST27), after which step ST21 is transitioned too.

Following thereupon, when the determination in step ST25 is affirmative, the pitching of the ball by the pitcher character PC toward the batter character BT will commence, based on the set conditions such as the pitch type and pitch position set and other conditions (step ST29). When the determination is negative in step ST25, the system will wait a prescribed time only for the control to be set, but, when that certain time has elapsed, a preset control value will be automatically set (step ST31), and then step ST29 will be transitioned to.

Following thereupon, a determination is made as to whether or not the ball character thrown by the pitcher character PC has come inside the meet cursor of the batter character BT (step ST33). Provision is made so that this meet cursor is set at a prescribed position according to such set conditions as the pitch type and pitch position set by the player, but is not displayed on the screen. The determination here in step ST33 is made by comparing the meet cursor position data and the position data when the ball character passes over home plate HB.

When the determination is affirmative in step ST33 (that is, when the meet cursor position data and the position data when the ball character passes over home plate HB coincide), the ball character reaches a condition wherein it is met by the bat of the batter character BT when the batter character BT performs a batting action. When, on the other hand, the determination in step ST33 is negative (that is, when the meet cursor position data and the position data when the ball character passes over home plate HB do not coincide), a determination is made as to whether or not the ball character entered the strike zone SZ (step ST35).

That is, when the position data when the ball passes home plate HB is within the strike zone SZ position data, that is judged a strike, and when the position data when the ball passes home plate HB is outside the strike zone SZ position data, that is judged a ball. Provision is made so that the value of the count resulting from these strike and ball judgments is stored in the memory unit 24.

When the determination in step ST35 is affirmative, a determination is made as to whether three strikes have been made (step ST37), and when the determination in step ST37 is affirmative, a determination is made as to whether or not three outs have been made (step ST39). When the determination in step ST37 is negative, step ST11 is transitioned to and the steps from that step on are repeatedly executed. In actual baseball, when a batter makes three strikes he or she is replaced by the next batter, but in this game the same batter character BT bats repeatedly until there are three outs.

When the determination in step ST39 is affirmative, that half inning is over, the player team comes up to bat, and a batting (offense) screen is changed to. When the determination in step ST39 is negative, step ST11 is transitioned to, and the steps from that step on are repeatedly executed.

When the determination in step ST35 is negative, a determination is made as to whether or not a walk was issued (step ST41), and when the determination in step ST41 is affirmative, a base runner screen is displayed (step ST43). This base runner is displayed in a mini window screen formed near first base. If there is already someone on base, that earlier runner (or runners) will proceed to the next base (or bases). Such advancing base runners will also be displayed in mini window screens formed near the bases. In this step ST43, moreover, score processing is performed in parallel with the display of the base runner screen or screens. That is, when there is a runner on every base, those runners will be forced to advance, whereupon scoring processing will performed. The scoring results will be stored in the memory unit 24 and also displayed on the information panel JK.

In real baseball, when a walk has been issued the next batter comes to the plate, but, as noted already, this game is designed so that the same batter character BT will bat repeatedly until three outs have been made. When the determination in step ST41 is negative, step ST11 is transitioned to, and the steps from that step on are repeatedly executed.

The case where the determination in step ST33 is affirmative (when the ball character has met the bat of the batter character BT) is described next. Specifically, when the determination in step ST33 is affirmative, a determination is made as to whether or not the power of the batter character BT (the batter) is greater than the power of the ball (step ST45). The power of the batter character BT is set, for example, by status (manner of ball meeting and conditions indicating range wherein ball is hit, etc.) given to that batter character BT, while the ball power is set by status (ball type and speed, etc.) given to the pitcher character PC.

When the determination in step ST45 is negative, a foul decision is made (step ST47), after which step ST11 is transitioned to, and the steps from that step on are repeatedly executed. When the determination in step ST45 is affirmative, a determination is made as to whether the met ball is a single, double, triple, or home run (step ST49), after which the ball flight screen is displayed (step ST51).

The judgment as to whether that hit is a single, double, triple, or home run is made by calculating the direction of ball flight, height of ball flight, and distance of ball flight, etc., for the ball character, based on data such as the power values of the batter character BT and the ball character, the position where the meet cursor acquired the ball character (position on left, right, top, or bottom of ball), and the timing wherewith the bat met the ball character.

Figure 12:
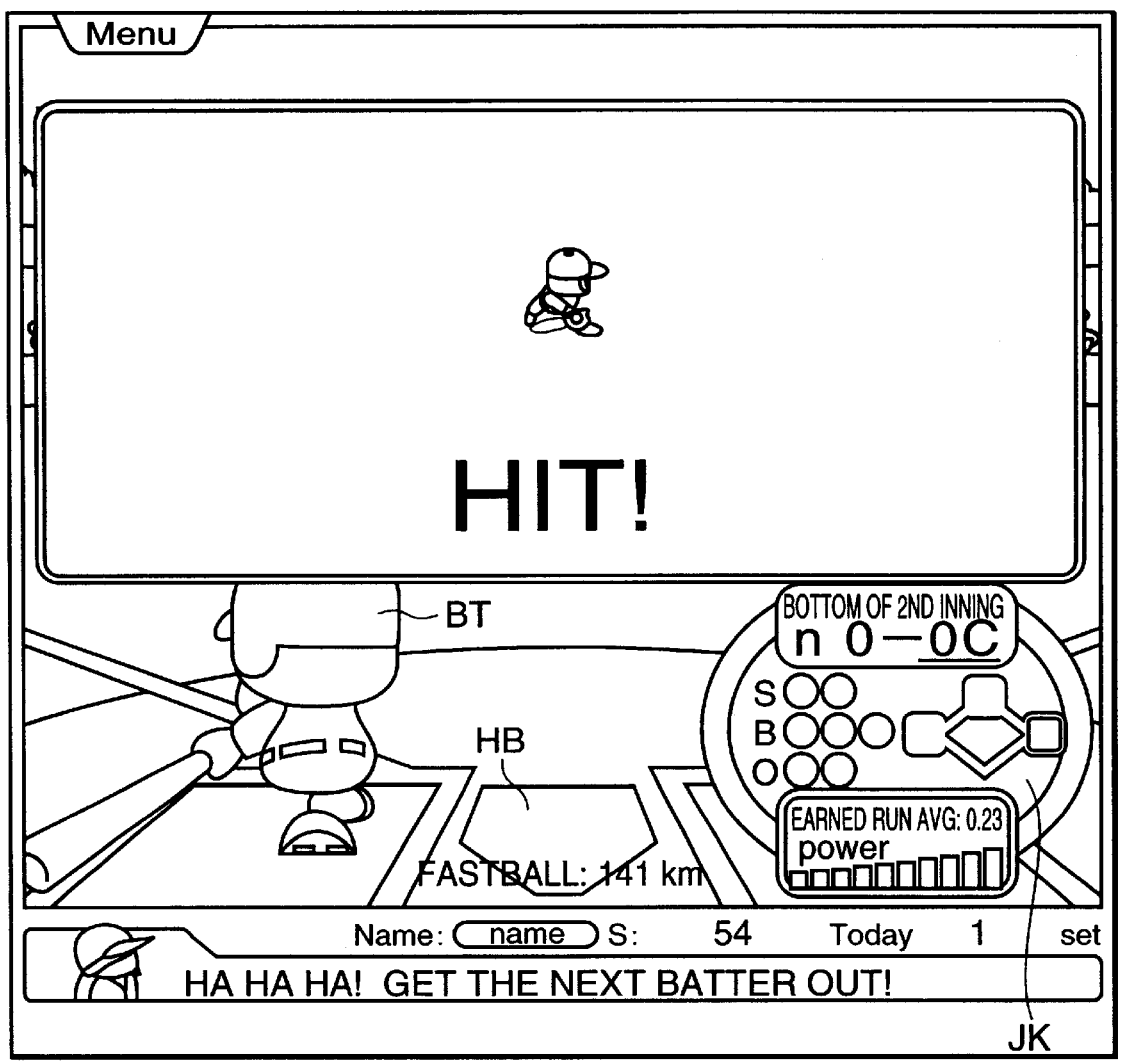
FIG. 12 is a diagram representing a game screen displayed on the monitor in the game system diagrammed in FIG. 1.

Following thereupon, a determination is made as to whether or not the ball character met by the batter character BT is a ball character that a fielder can catch (step ST53). This determination will be made on the bases of the ball flight direction, ball flight height, and ball flight distance data for the ball character calculated in step ST49 and on fielder position data. When the determination in step ST53 is negative, a hit screen such as that diagrammed in FIG. 12 is displayed, and a base runner screen that accords with the particulars of that determination is displayed (step ST55). Step ST11 is then transitioned to, and the steps from that step on are repeatedly executed. That base runner screen is displayed by a mini window screen as noted earlier.

In this step ST55, moreover, score processing is performed in parallel with the display of the base runner screen.

That is, scoring is processed according to such conditions as whether the ball hit by the batter character BT was a single, double, triple, or home run, and whether or not there were base runners, and the scoring results are stored in the memory unit 24 and displayed on the information panel JK.

Figure 13:
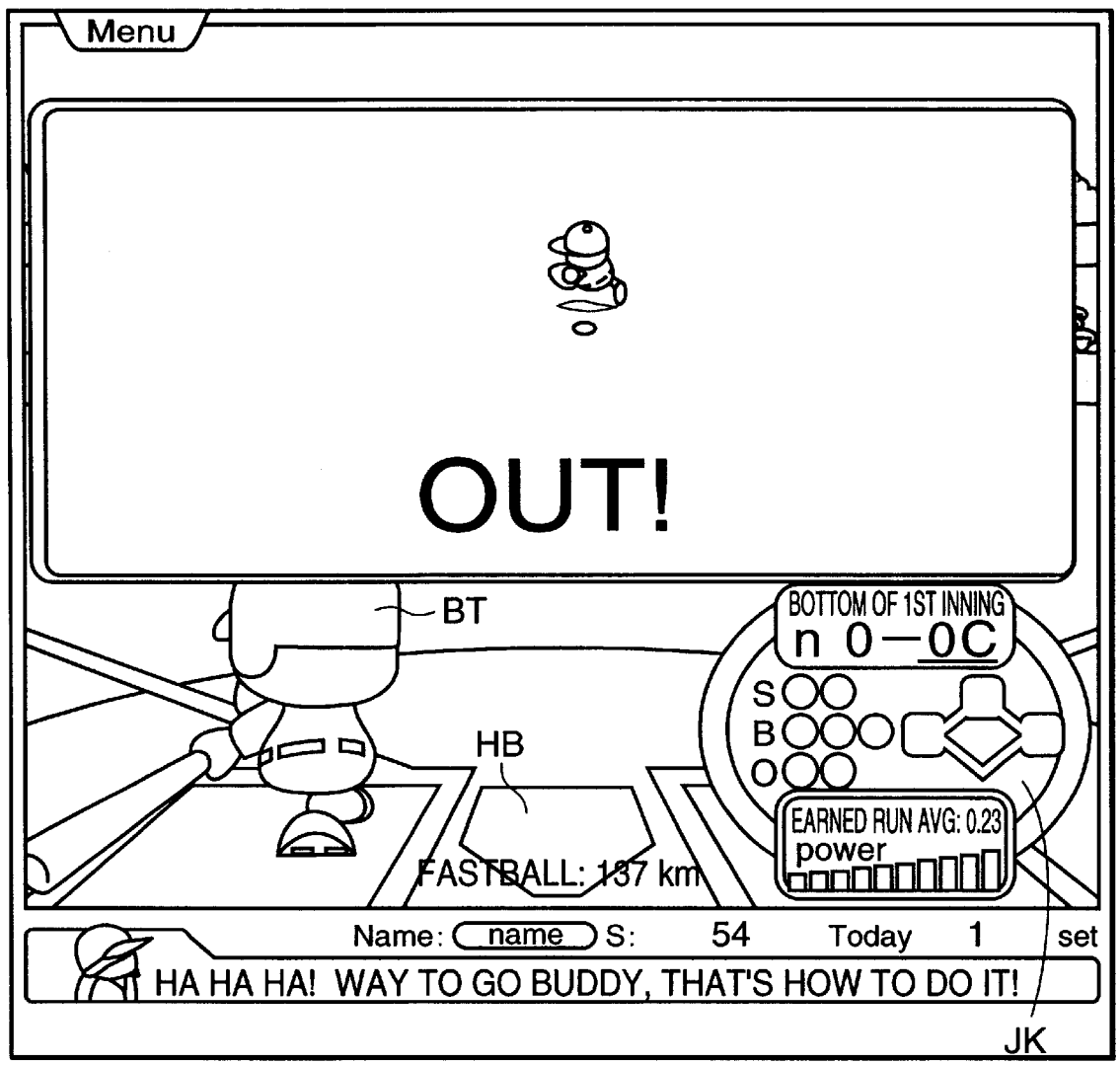
FIG. 13 is a diagram representing a game screen displayed on the monitor in the game system diagrammed in FIG. 1.

When the determination in step ST53 is affirmative, an out screen like that diagrammed in FIG. 13 is displayed, an out call is made (step ST57), and a determination is made as to whether or not that is the third out (step ST59). If the determination in step ST59 is negative, step ST11 is transitioned to, and the steps from that step on are repeatedly executed. When the determination in step ST59 is affirmative, that half inning ends, the player team comes to bat, and the batting screen is changed to.

Figure 5:
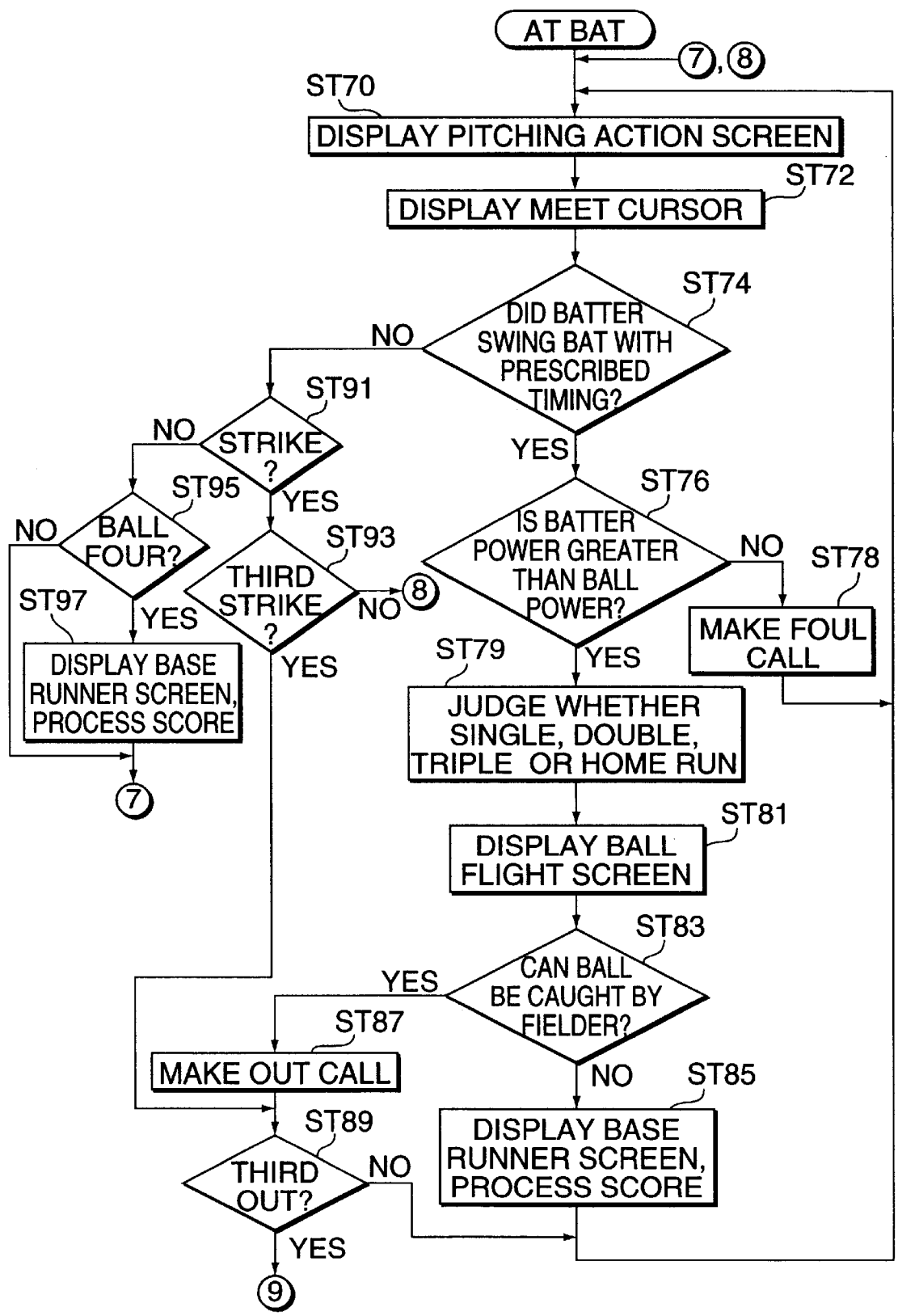
FIG. 5 is a flowchart for describing the operations of the game system diagrammed in FIG. 1.
Figure 6:
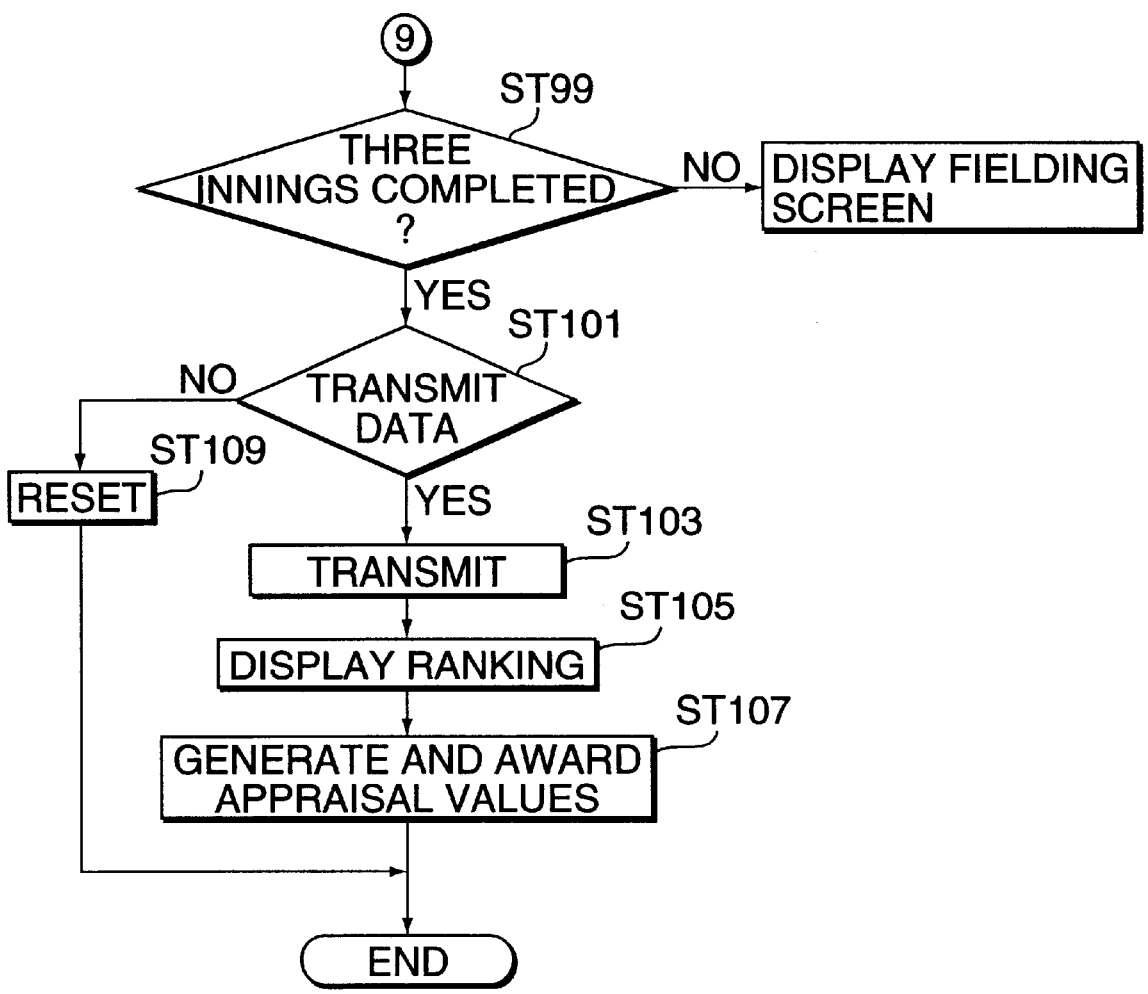
FIG. 6 is a flowchart for describing the operations of the game system diagrammed in FIG. 1.
Figure 14:
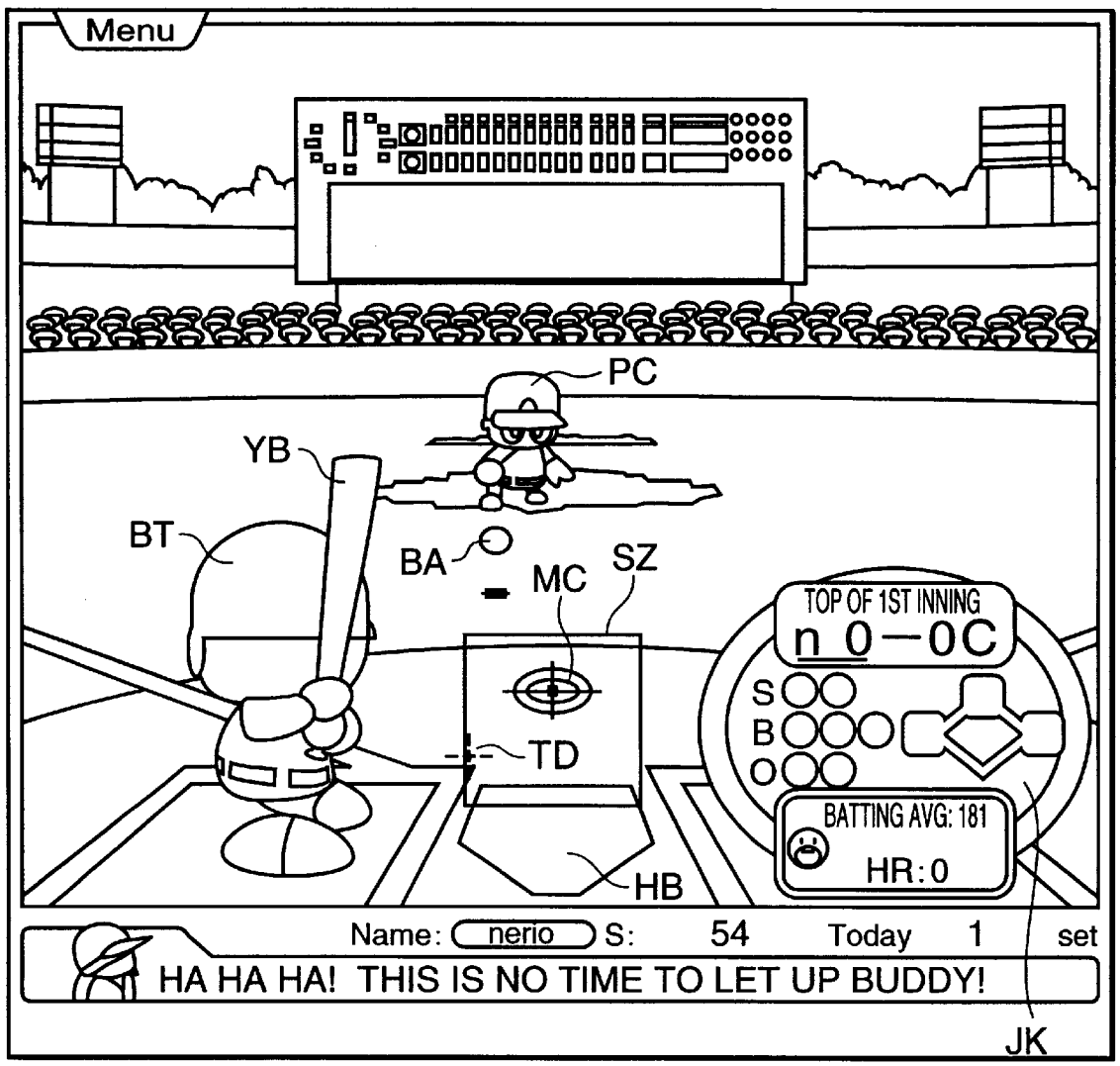
FIG. 14 is a diagram representing a game screen displayed on the monitor in the game system diagrammed in FIG. 1.

A description is given next of the situation when the player team comes to bat (cf. FIG. 5 and FIG. 6). When the player team is at bat, a batting screen such as that diagrammed in FIG. 14 is displayed. In this batting screen, the pitcher character of the computer team is displayed roughly in the center of the screen and the batter character BT of the player team is displayed in the batter's box. The strike zone SZ is displayed above the home plate HB, but, in addition thereto, a mark TD indicating the ball target point (the point where the ball is predicted to pass over the home plate HB) is displayed, and a meet cursor MC manipulated by the player is also displayed. In the middle of the screen, moreover, a ball character BA and, below that, the shadow of the ball are displayed. The information panel JK is also displayed at the lower right of the screen, as when the fielding screen is active, for indicating such game information as the number of the inning, whether the top or bottom of the inning, and the score, etc.

When the ball character BA is thrown toward the batter character BT by the pitcher character PC (step ST70), as diagrammed in FIG. 14, and the player manipulates the mouse 22, superimposes the pointer displayed in linkage with the mouse 22 over the position of the meet cursor MC, and moves the pointer to the ball target point TD side, the meet cursor MC is displayed moving to the ball target point TD side (step ST72). Then, when the mouse 22 is left-clicked at the same time that the shadow of the ball character BA passes over the home plate HB, for example, in a condition wherein the meet cursor MC coincides with the position of the ball target point TD, the batter character BT executes a swing with the bat YB.

At that time, a determination is made as to whether or not the batter character BT (the batter) swung the bat YB (step ST74), and if that determination is affirmative, the bat YB is deemed to have met the ball character BA, and a determination is made as to whether or not the power of the batter character BT (the batter) exceeds the power of the ball (step ST76). The power of the batter character BT is set, for example, by status (manner of ball meeting and conditions indicating range wherein ball is hit, etc.) given to that batter character BT, while the ball power is set by status (ball type and speed, etc.) given to the pitcher character PC.

When the determination in step ST76 is negative, a foul determination is made (step ST78), after which step ST70 is transitioned to, and the steps from that step on are repeatedly executed. When the determination in step ST76 is affirmative, a determination is made as to whether the met ball is a single, double, triple, or home run (step ST79), after which the ball flight screen is displayed (step ST81).

The judgment as to whether that hit is a single, double, triple, or home run (that is, the judgment of the degree of the success of the batting action) is made by calculating the direction of ball flight, height of ball flight, and distance of ball flight, etc., for the ball character BA, based on data such as the power values of the batter character BT and the ball character BA, the position where the meet cursor MC acquired the ball character BA (position on left, right, top, or bottom of ball character), and the timing wherewith the bat YB met the ball character BA, etc.

Following thereupon, a determination is made as to whether or not the ball character BA met by the batter character BT is a ball that a fielder can catch (step ST83). This determination will be made on the bases of the ball flight direction, ball flight height, and ball flight distance data for the ball character BA calculated in step ST79 and on fielder position data. When the determination in step ST83 is negative, a hit screen such as that diagrammed in FIG. 12 is displayed, as noted above, and a base runner screen that accords with the particulars of that determination is displayed (step ST85). Step ST70 is then transitioned to, and the steps from that step on are repeatedly executed. That base runner screen is displayed by a mini window screen as noted earlier.

In this step ST85, moreover, score processing is performed in parallel with the display of the base runner screen. That is, scoring is processed on the basis of such conditions as whether the ball character BA hit by the batter character BT was a single, double, triple, or home run, and whether or not there were base runners, and the scoring results are stored in the memory unit 24 and displayed on the information panel JK.

When the determination in step ST83 is affirmative, an out screen like that diagrammed in FIG. 13, as noted earlier, is displayed, an out judgment is made (step ST87), and a determination is made as to whether or not that is the third out (step ST89). If the determination in step ST89 is negative, step ST70 is transitioned to, and the steps from that step on are repeatedly executed.

When the determination in step ST74 is negative, a determination is made as to whether or not this was a strike (step ST91), and if that determination is affirmative, a determination is made as to whether or not it was the third strike (step ST93). When the determination in step ST93 is affirmative, step ST89 is transitioned to, whereas when the determination in step 93 is negative, step ST70 is transitioned to, and the steps from that step on are repeatedly executed. If a swing and a miss occurred in step ST74, that is counted as a strike in step ST91.

When the determination in step ST91 is negative, a determination is made as to whether or not a walk was issued (step ST95). When that determination is affirmative, the base runner screen is displayed (step ST97). Thereafter, step ST70 is transitioned to, and the steps from that step on are repeatedly executed. This base runner is displayed in a mini window screen formed near first base. If there is already someone on base, that earlier runner (or runners) will proceed to the next base (or bases). Such advancing base runners will also be displayed in mini window screens formed near the bases. In this step ST97, moreover, score processing is performed in parallel with the display of the base runner screen or screens. That is, when there is a runner on every base, those runners will be forced to advance, whereupon scoring processing will be performed. The scoring results will be stored in the memory unit 24 and also displayed on the information panel JK. When the determination in step ST95 is negative, step ST70 is transitioned to, and the steps from that step on are repeatedly executed.

Figure 15:
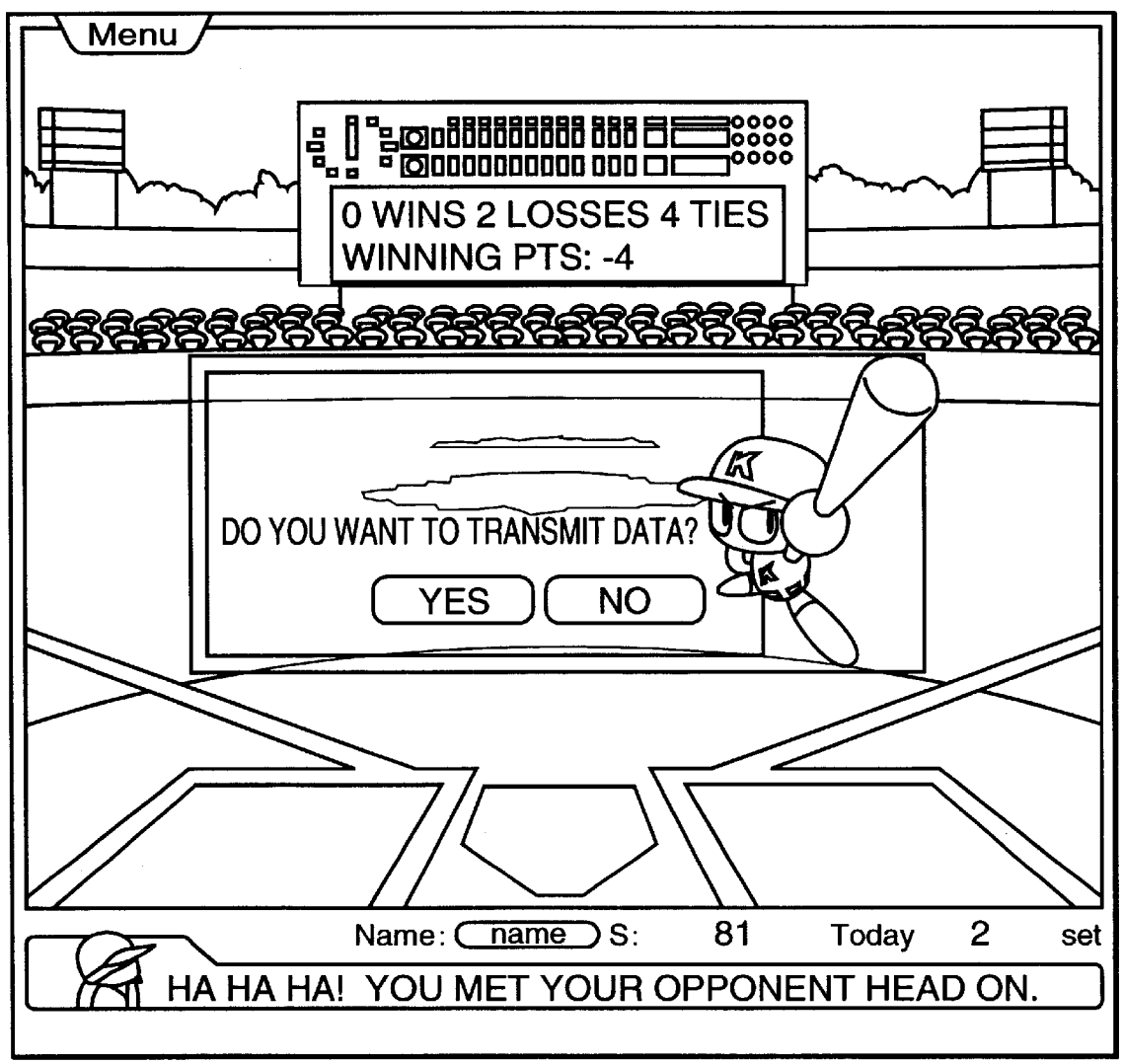
FIG. 15 is a diagram representing a game screen displayed on the monitor in the game system diagrammed in FIG. 1.

When the determination in step ST89 is affirmative, a determination is made as to whether or not three innings have been played (step ST99), and when that determination is negative, the fielding screen is displayed and the player team takes the field. When the determination in step ST99 is affirmative, a data transmission screen such as that diagrammed in FIG. 15 is displayed. When the "yes" button on this screen is clicked on, a determination is made thereafter as to whether or not to transmit data (step ST101), and when that determination is affirmative, various information is transmitted from the computer 14 to the server 16 (step ST103), namely the particulars of the game results (that is, the "winning points" of the player team), the particulars of the pitching results for the pitcher character PC for the player team (such as the number of pitches made, earned run average, etc.), and the particulars of the batting results for the batter character BT of the player team (such as the batting average, number of home runs, etc.).

The "winning points" of the player team, the pitching results of the pitcher character PC of the player team, and the batting results of the batter character BT thereof, etc., are calculated beforehand on the computer 14 end, and provision is made so that those data can only be preserved by the server 16.

At the server 16, meanwhile, the "winning points" data that are sent in from the computers 14 are stored in the memory unit 42, and ranking is performed based on weekly or monthly totals, for example. The results of this ranking are transmitted to the computers 14, either automatically or in response to requests from players. These ranking results (ranking table) that are so transmitted, which are configured of a number of elements such as "nickname," "score," "money," "home runs," "power," and "meet," etc., as diagrammed in FIG. 16, are displayed on the monitor 18 (step ST105). Simultaneously, moreover, appraisal values (prize money or prize goods, etc., based in the game) are generated and awarded to those having the highest number of home runs or the like (step ST107).

The "scores" are winning points, and ranking is determined by those winning points. This is expected to generate opportunities to continue the baseball game. The "money" element refers to prize money awarded according to such results as winning points or home runs. This prize money can be used to purchase items for more advantageously carrying on the game, and can be used as various other kinds of assets in the game.

The "home runs" element is the number of home runs, "power" is the power wherewith the batter character BT can hit the ball character BA, and "meet" indicates the size of the range wherewith the ball character BA can be hit. The point value of the "power" element increases or decreases according to the particulars of the batting results such as batting average or number of home runs, etc., and is decreased by such factors as pitch types that are hard to handle. "Power" affects ball flight distance, etc. The point value of the "meet" element increases or decreases according to the particulars of the batting results such as batting average and number of home runs, etc. The size of the meet cursor MC changes according to the value of the "meet" element, and that affects the batting average, etc.

These "power" and "meet" elements and the like change according to the results of each game and constitute great incentive information to encourage the player in advancing the game. This incentive information is fetched to the computer 14 of the player from the server system 16 via the internet 12 when the next game is played, and the next game is advanced on the basis of that fetched incentive information. As a consequence, it is possible to implement games of outstanding interest.

When the determination in step ST101 is negative, on the other hand, the game results data, player team pitcher character PC pitching results data, and player team batter character BT batting results data are reset (step ST109), and the game ends.

Figure 17:
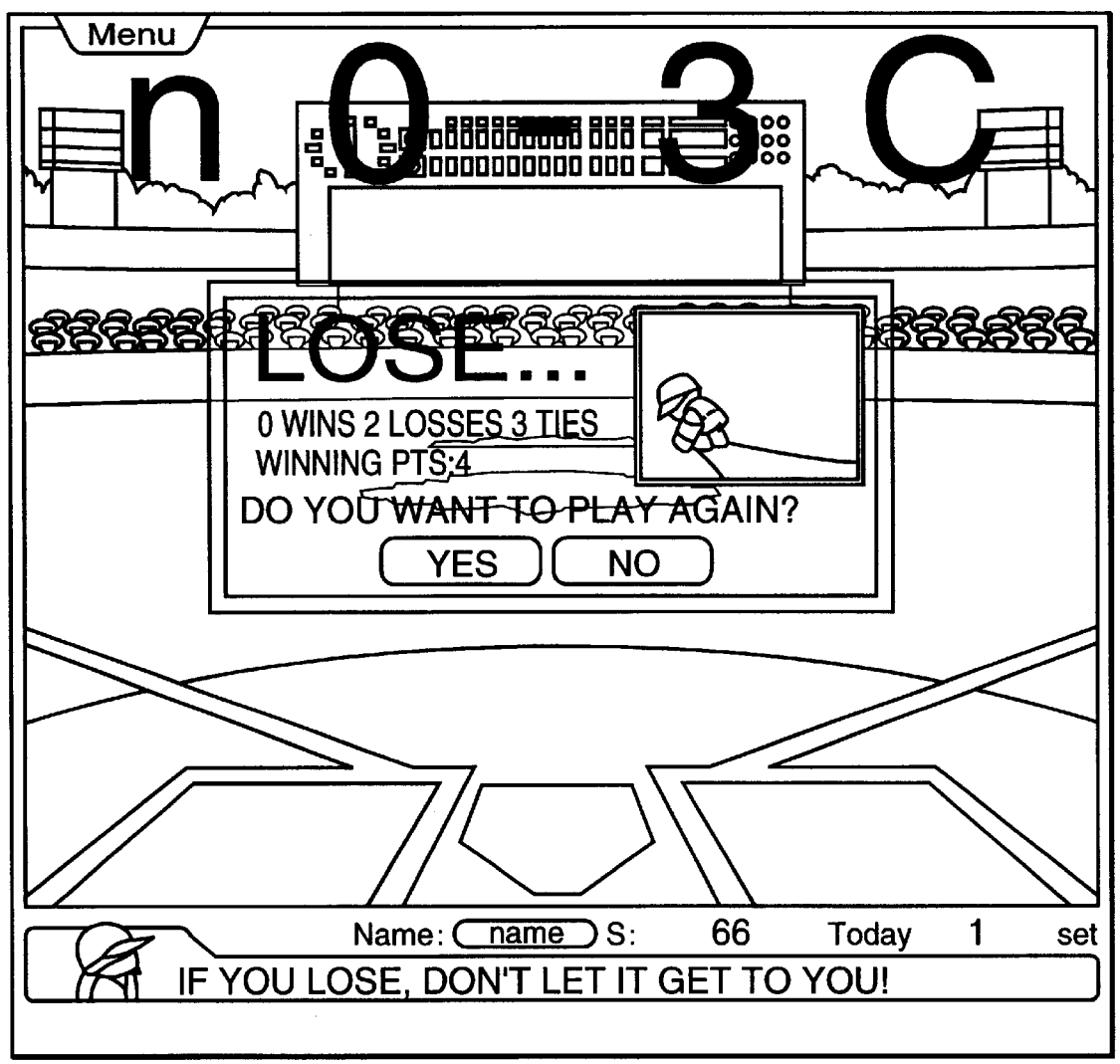
FIG. 17 is a diagram representing a game screen displayed on the monitor in the game system diagrammed in FIG. 1.

Furthermore, when the determination in step ST99 is affirmative, a game continuation screen like that diagrammed in FIG. 17 is displayed prior to the display of the data transmission screen, so that a query is made as to whether or not to continue with another game. If "yes" is selected, it becomes possible to play another game, and if "no" is selected, the game will end. When the previous game was lost, "LOSE" will be displayed, when it was won, "WIN" will be displayed, and when it was a tie, "DRAW" will be displayed.

With this embodiment aspect, as described in the foregoing, provision is made for the player, when playing the baseball game, to control the behavior of the pitcher character PC with the mouse 22, wherefore, when it is necessary to make pitch selections, speed settings, and control settings quickly, such selection and setting can be performed quickly. Provision is also made for the player, when playing the baseball game, to control the behavior of the batter character BT with the mouse 22, wherefore, when the ball character BA is thrown with various pitch types and speeds, the player can respond to those variations quickly, and can perform accurate batting at the desired position.

Provision is made also so that, using the computers 14 in a broad user layer, the results of baseball games played on the computers 14 based on a sports/game program distributed directly or indirectly from the server 16 are collectively and centrally processed by the server 16, and ranking displays are made based thereon, wherefore it is easy to create a sports/game environment that can be participated in by a plurality of persons. Also, persons who have participated in the baseball game are able to ascertain their own performance in terms relative to the whole, making it possible to bring motives for continuing the baseball game into play, and, when certain conditions have been met, sports/game values are obtained, providing further incentive to continue the game.

In this embodiment aspect, a mouse 22 was used as the pointing device, but the same effectiveness can be gained with a portable trackball, a portable slide pad, or any other pointing device of like type wherewith it is possible, with a single manipulation by the player, to simultaneously input the direction of displacement and amount of displacement in the pointer and wherewith also the input and acceptance of signals with the timing of the manipulations are possible. In this embodiment aspect, moreover, a baseball game is described, but the invention is not limited to a baseball game (baseball board). Application is also possible to a homerun derby or other competitive game.

Based on the present invention, as described in the foregoing, provision is made so that, when the player team is at bat, the batting action and positioning point of the bat of the batter character relative to the ball character are determined by manipulating a mouse or other pointing device, while, when the player team is in the field, the pitching action and the pitch course for the ball character displayed moving from the pitcher character toward the batter character are determined by manipulating the pointing device, the end of the game is received, and the particulars of the game results and the particulars of the batting results and the pitching results of the player team are uploaded to a recording unit in the server connected via a network to the computers, wherefore it is made possible to implement a baseball game in an environment difficult to achieve with a dedicated game apparatus and a joy stick used therewith.

In the present invention, a game procedure control program is recorded which judges the degree of success of the batting action according to the extent to which the ball character and the positioning point during the batting action overlap.

With the above feature, the degree of success of the batting action is judged according to the extent of the overlap between the ball character and the positioning point. Thus the baseball game is advanced smoothly.

In addition, a game procedure control program is recorded which tallies the particulars of the game results for each player, and ranks those players according to the results of that tally.

Based on the above features, the particulars of the game results are tallied for each player, and those players are ranked based on the results of that tally. Thus a player can be motivated to continue playing the baseball game. The game results may also be the difference in the scores made by the player team and the computer team.

Moreover, parameters are set which define the respective abilities of the batter character and the pitcher character of the player team, and a game procedure control program is recorded which alters those parameters according to the batting results and the pitching results.

With the above features, the ability of the batting character is set and altered by altering a parameter in response to the batting results, and the ability of the pitcher character is set and altered by altering a parameter in response to the pitching results. Thus the baseball game becomes rich in variation and, as a result, becomes a very interesting game.

In addition, a game procedure control program is recorded that starts the baseball game by downloading the particulars of the batting results and pitching results of the batting character and pitching character of the player team from the memory unit, in response to a request from the computer.

With the above feature, the particulars of the batting results and pitching results of the batter character and pitcher character of the player team are downloaded from the memory unit in the server when the game starts. Thus the baseball game is always continued on the basis of the latest game results data, whereby accurate ranking can be performed. Also, the batting results and pitching results of the batter character and pitcher character of the player team are fetched from the server, and the next game is started on the basis of those fetched batting results and pitching results. Thus the fun and the enthusiasm of the player for developing hitter and pitcher characters are increased, providing both motivation and opportunity for playing the next game, and a very interesting baseball game is implemented.

Furthermore, a server capable of being accessed from a computer operated by a player via a network.

With the above feature, a baseball game is performed by a server being accessed via a network from a computer operated by a player. Thus, when the game ends, the particulars of the game results and the particulars of the batting results and pitching results for the player team can be uploaded to a recording unit in the server.

Alternatively, a present invention also relates to an advance control method for causing a pointer and a game image containing a plurality of game character to be displayed on a monitor screen of a computer and for, at the same time, receiving the input of instruction particulars relating to the display position of a pointer resulting from movement control inputs on the monitor screen for that pointer from a pointing device such as a mouse, and clicking operations with that pointing device, made by a player, and executing a baseball game, wherein: the baseball game is one that is advanced by a player team and a team based on computer control, using a ball character as a game medium, alternately coming to bat and taking to the field; the positioning point for the ball character at the bat of a batter character and the batting action of the batting character are determined by manipulations of the pointing device when the player team is at bat, a pitching course and pitching action are determined, by manipulations of the pointing device, for the ball character caused to be displayed moving so as to proceed from a pitcher character toward the batter character when the player team is in the field; the end of the game is accepted; and the game result particulars and the particulars of both the batting results and the pitching results of the player team are uploaded into a recording unit in a server connected to the computer via a network.

With the above features, a pitcher character throwing a ball character and a batter character hitting the ball character that is hurled in are displayed on the monitor screen, and, when the player team is at bat, the positioning point of the bat of the batter character relative to the ball character and the batting action are determined by manipulating the pointing device. When the player team is in the field, the pitching action and pitching course for the ball character displayed so as to move from the pitcher character toward the batter character are determined by manipulations of the mouse or other pointing device. When the game is finished, the particulars of the game results and the particulars of the batting results and pitching results for the player team are uploaded to the recording unit in the server connected via a network to the computer operated by the player. Thus it becomes possible to implement a baseball game in an environment difficult to achieve with a dedicated game apparatus and a joy stick for such an apparatus.

This application is based on Japanese application serial no. 2000-232348 filed with Japanese Patent Office on Jul. 31, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer-readable recording medium whereon a game procedure control program is recorded for causing a pointer and a game image containing a plurality of characters to be displayed on a monitor screen of a computer, and also for receiving input of instruction particulars relating to display position of a pointer resulting from movement control inputs on said monitor screen for that pointer from a pointing device, and clicking operations from that pointing device, made by a player, and executing a baseball game, where said baseball game being progressed by a player team and a team based on computer control, using a ball character as a game medium, alternately coming to bat and taking to a field; said game procedure control program comprising the steps of:

determining a positioning point for said ball character at a bat of a batter character and batting action of that batting character by manipulations of said pointing device, when said player team is at bat;

determining a pitching course and pitching action, by manipulations of said pointing device, for said ball character to be displayed moving so as to proceed from a pitcher character toward said batter character when said player team is in the field; and uploading, upon end of the game, game result particulars and particulars of both batting results and pitching results of said player team into a recording unit in a server connected to said computer via a network.

2. The computer-readable recording medium according to claim 1, wherein said game procedure control program further comprising the steps of judging a degree of success of said batting action according to extent to which said ball character and said positioning point during said batting action overlap.

3. The computer-readable recording medium according to claim 1, wherein said game procedure control program further comprising the steps of tallying particulars of said game results for each player, and ranking those players according to results of that tally.

4. The computer-readable recording medium according to claim 1, wherein said game procedure control program further comprising the steps of setting parameters for defining respective abilities of said batter character and said pitcher character of said player team, and altering those parameters according to said batting results and said pitching results.

5. The computer-readable recording medium according to claim 1, wherein said game procedure control program further comprising the step of starting said baseball game by downloading of particulars of said batting results and pitching results of said batting character and pitching character of said player team from said memory unit, in response to a request from said computer.

6. A server which can be accessed from a computer controlled by a player via a network, comprising a computer-readable recording medium whereon a game procedure control program is recorded for causing a pointer and a game image containing a plurality of characters to be displayed on a monitor screen of a computer, and also for receiving input of instruction particulars relating to display position of a pointer resulting from movement control inputs on said monitor screen for that pointer from a pointing device, and clicking operations from that pointing device, made by a player, and executing a baseball game, where said baseball game being progressed by a player team and a team based on computer control, using a ball character as a game medium, alternately coming to bat and taking to a field; said game procedure control program comprising the steps of:

determining a positioning point for said ball character at a bat of a batter character and batting action of that batting character by manipulations of said pointing device, when said player team is at bat;

determining a pitching course and pitching action, by manipulations of said pointing device, for said ball character to be displayed moving so as to proceed from a pitcher character toward said batter character when said player team is in the field; and uploading, upon end of the game, game result particulars and particulars of both batting results and pitching results of said player team into a recording unit in a server connected to said computer via a network.

7. A game procedure control method for causing a pointer and a game image containing a plurality of game characters to be displayed on a monitor screen of a computer, and also for receiving input of instruction particulars relating to display position of a pointer resulting from movement control inputs on said monitor screen for that pointer from a pointing device, and clicking operations from that pointing device, made by a player, and executing a baseball game, wherein said baseball game being progressed by a player team and a team based on computer control, using a ball character as a game medium, alternately coming to bat and taking to a field; said method comprising the steps of:

determining a positioning point for said ball character at a bat of a batter character and batting action of that batting character by manipulations of said pointing device when said player team is at bat;

determining a pitching course and pitching action, by manipulations of said pointing device, for said ball character caused to be displayed moving so as to proceed from a pitcher character toward said batter character when said player team is in the field; and uploading, upon end of the game, game result particulars and particulars of both batting results and pitching results of said player team into a recording unit in a server connected to said computer via a network.

8. The game procedure control method according to claim 7, further comprising the step of judging a degree of success of said batting action according to extent to which said ball character and said positioning point during said batting action overlap.

9. The game procedure control method according to claim 7, further comprising the steps of tallying particulars of said game results for each player, and ranking those players according to results of that tally.

10. The game procedure control method according to claim 7, further comprising the steps of setting parameters for defining respective abilities of said batter character and said pitcher character of said player team, and altering those parameters according to said batting results and said pitching results.

11. The game procedure control method according to claim 7, further comprising the step of starting said baseball game by downloading of particulars of said batting results and pitching results of said batting character and pitching character of said player team from said memory unit, in response to a request from said computer.

* * * * *